United States Patent
Bayrakdar

(10) Patent No.: US 9,458,942 B2
(45) Date of Patent: Oct. 4, 2016

(54) CONTROL VALVE FOR A CAMSHAFT ADJUSTER

(71) Applicant: Schaeffler Technologies GmbH & Co. KG, Herzogenaurach (DE)

(72) Inventor: Ali Bayrakdar, Rothenbach/Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 64 days.

(21) Appl. No.: 14/402,561

(22) PCT Filed: Mar. 8, 2013

(86) PCT No.: PCT/EP2013/054677
§ 371 (c)(1),
(2) Date: Nov. 20, 2014

(87) PCT Pub. No.: WO2013/174531
PCT Pub. Date: Nov. 28, 2013

(65) Prior Publication Data
US 2015/0129069 A1 May 14, 2015

(30) Foreign Application Priority Data

May 25, 2012 (DE) .......................... 10 2012 208 809

(51) Int. Cl.
*F16L 41/00* (2006.01)
*F16D 3/00* (2006.01)
(Continued)

(52) U.S. Cl.
CPC ............. *F16K 11/0716* (2013.01); *F01L 1/344* (2013.01); *F01L 1/3442* (2013.01); *F01L 5/14* (2013.01); *F01L 2001/0475* (2013.01);
(Continued)

(58) Field of Classification Search
CPC ............. F16K 11/716; F16K 11/0712; F16K 27/048; F16K 31/0613; F16K 15/183; F01L 1/344; F01L 1/3442; F01L 5/14; F01L 2001/34426; F01L 2001/3443; F01L 2001/34423; F01L 2001/34433; F01L 2001/0475; F01L 2001/0476; F01L 2001/34453; Y10T 137/86775; Y10T 137/87169; Y10T 137/86702; Y10T 137/86574; Y10T 137/8671; Y10T 137/86622; Y10T 137/8663; Y10T 137/86694
USPC .............. 137/625.68, 625.2, 625.69, 625.65, 137/625.66, 625.67; 123/90.17; 403/93, 403/193
See application file for complete search history.

(56) References Cited

U.S. PATENT DOCUMENTS 6,435,017 B1 * 8/2002 Nowicki, Jr. ....... G01L 19/0007
403/93
2005/0120989 A1 6/2005 Geyer et al.
(Continued)

FOREIGN PATENT DOCUMENTS

CN 101889129 A 11/2010
CN 102421554 A 4/2012
(Continued)

*Primary Examiner* — John K Fristoe, Jr.
*Assistant Examiner* — Kelsey Rohman
(74) *Attorney, Agent, or Firm* — Volpe and Koenig, P.C.

(57) ABSTRACT

A control valve (4) for controlling pressure medium flows of a camshaft adjuster, which control valve includes a substantially hollow cylindrical control sleeve (6), which is disposed inside a casing (8), and a control piston (12) which is guided axially displaceably inside the control sleeve (6) against the spring force of a spring element (14), the control sleeve (6) having at one axial end a base (22) which serves as an axial contact surface for the spring element (14).

2 Claims, 2 Drawing Sheets

(51) Int. Cl.

| | |
|---|---|
| *F16C 11/00* | (2006.01) |
| *F01L 1/34* | (2006.01) |
| *F16K 11/07* | (2006.01) |
| *F15B 13/04* | (2006.01) |
| *F16K 31/06* | (2006.01) |
| *F16K 11/074* | (2006.01) |
| *F01L 1/047* | (2006.01) |
| *F16K 15/18* | (2006.01) |
| *F01L 1/344* | (2006.01) |
| *F16K 27/04* | (2006.01) |
| *F01L 5/14* | (2006.01) |

(52) U.S. Cl.
CPC ............... *F01L 2001/0476* (2013.01); *F01L 2001/3443* (2013.01); *F01L 2001/34423* (2013.01); *F01L 2001/34426* (2013.01); *F01L 2001/34433* (2013.01); *F01L 2001/34453* (2013.01); *F16K 11/0712* (2013.01); *F16K 15/183* (2013.01); *F16K 27/048* (2013.01); *F16K 31/0613* (2013.01); *Y10T 137/8663* (2015.04); *Y10T 137/8671* (2015.04); *Y10T 137/86574* (2015.04); *Y10T 137/86622* (2015.04); *Y10T 137/86694* (2015.04); *Y10T 137/86702* (2015.04); *Y10T 137/86775* (2015.04); *Y10T 137/87169* (2015.04)

(56) References Cited

U.S. PATENT DOCUMENTS

| | | |
|---|---|---|
| 2005/0252561 A1 | 11/2005 | Strauss et al. |
| 2010/0288384 A1 | 11/2010 | Hoppe et al. |
| 2011/0067656 A1* | 3/2011 | Ottersbach ............ F01L 1/3442 123/90.15 |
| 2011/0174253 A1 | 7/2011 | Hoppe et al. |
| 2011/0220046 A1* | 9/2011 | Welte ................... F01L 1/3442 123/90.15 |
| 2012/0111296 A1 | 5/2012 | Hoppe et al. |
| 2012/0132160 A1 | 5/2012 | Malen et al. |
| 2012/0145105 A1 | 6/2012 | Bayrakdar |
| 2012/0152189 A1 | 6/2012 | Bayrakdar |
| 2012/0210963 A1 | 8/2012 | Bayrakdar |
| 2012/0325169 A1 | 12/2012 | Draheim |
| 2013/0112163 A1 | 5/2013 | Bayrakdar |

FOREIGN PATENT DOCUMENTS

| | | |
|---|---|---|
| DE | 10204672 A | 8/2003 |
| DE | 10346448 | 6/2005 |
| DE | 102004038160 | 12/2005 |
| DE | 102008004591 | 7/2009 |
| DE | 102009031701 | 1/2011 |
| DE | 102009039384 | 3/2011 |
| DE | 102009039385 | 3/2011 |
| DE | 102009051519 | 5/2011 |
| DE | 102010012479 | 9/2011 |
| DE | 102010026853 | 1/2012 |
| EP | 1596041 | 11/2005 |

* cited by examiner

CONTROL VALVE FOR A CAMSHAFT ADJUSTER

FIELD OF THE INVENTION

The invention relates to a control valve for controlling flows of pressurized medium of a camshaft adjuster, wherein this control valve comprises an essentially hollow cylindrical control sleeve that is arranged inside a casing, and a guided control piston that can move in the axial direction inside the control sleeve against a spring force of a spring element.

BACKGROUND

In an internal combustion engine of a motor vehicle, a camshaft that is in driven connection with a crankshaft is typically used for actuating the gas exchange valves. Here it has proven advantageous to be able to change the opening and closing times of the gas exchange valves while the internal combustion engine is running. By adjusting the opening and closing times, for example, as a function of the current rotational speed, in particular, the fuel consumption can be reduced, the exhaust gas behavior can be positively influenced, and the engine efficiency can be increased.

The variability of the gas exchange valve control times is usually achieved through a relative change of the phase position of the camshaft relative to the crankshaft. For this purpose, typically a so-called camshaft adjuster is integrated into the drive train by means of which the torque is transferred from the crankshaft to the camshaft. The mounting of modern camshaft adjusters is located, for example, on the drive-side end of the camshaft, on an intermediate shaft, on a non-rotating component, or on the crankshaft.

The crankshaft adjuster is here constructed such that, during the operation, the phase position between the crankshaft and camshaft can be reliably maintained and if necessary the camshaft can be rotated in a certain angle range relative to the crankshaft. For this purpose, the camshaft adjuster is formed essentially with at least two pressure chambers acting against each other. Through targeted connection of the pressure chambers with a pressurized medium pump or with a pressurized medium tank, the phase of the camshaft can be adjusted or maintained relative to the crankshaft.

The pressurized medium supply to the pressure chambers and the pressurized medium discharge from the pressure chambers is usually controlled by means of a control valve, usually in the form of a multiple-path gate valve. This typically comprises, as essential components, a control sleeve and a control piston that is held in the control sleeve so that it can move in the axial direction against the spring force of a spring element and that is actuated by an actuator, typically an electromagnet. The control valve also has, in particular, a pressurized medium connection, a discharge connection and work connections by means of which the pressurized medium can be injected into a pressure chamber or discharged out from a pressure chamber. For the switchable distribution of the pressurized medium to the work connections, a casing is further provided that has corresponding pressurized medium channels to a pressure chamber that can be actuated by means of the control piston. Depending on the position of the control piston, for example, one of the pressure chambers is connected to the supply connection via one of the work connections and is filled with pressurized medium. At the same time, the opposing pressure chamber communicates via the work connection allocated to it with the discharge connection on the control valve and is in this way emptied.

In one common construction, such a control valve is constructed, for example, as a so-called central valve that is inserted into a central hole of the camshaft adjuster and is screwed to the camshaft.

A control valve of the type noted above is known, for example, from DE 10 2010 026 853 A1 or from DE 10 2008 004 591 A1. According to DE 10 2008 004 591 A1, the control valve is inserted into a central screw that is screwed to a camshaft under attachment, on its part, of the camshaft adjuster.

To be able to withstand the mechanical loads during the operation of the control valve, in the control valve according to DE 10 2008 004 591 A1, a solid, shaped spring receptacle that is supported on the casing is provided for supporting the spring element. A solid spring receptacle that forms part of the casing is also formed in the control valve corresponding to DE 10 2010 026 853 A1.

From DE 10 2009 051 519 A1 it is further known to provide a separate spring plate that is supported, on its side, on the casing, for supporting the spring element.

SUMMARY

The present invention is based on the objective of forming a control valve of the type noted above to the extent that it enables the simplest and most economical production possible.

The stated objective is met according to the invention for a control valve of the type noted above such that the control sleeve has, at one axial end, a base that is used as an axial contact surface for the spring element.

The invention here starts, in a first step, from the idea that a spring receptacle made from the casing is associated with additional material expense. The casing is usually made from a plastic, so that a corresponding solid construction is required. According to DE 10 2010 026 853 A1, the counter support formed by the spring receptacle of the casing is also supported by means of a reinforced section of the control sleeve. The use of a separate component for supporting the spring element represents, in turn, an additional production and installation step that increases the costs of the control valve.

In a second step, the invention recognizes that the a counter support can be formed for supporting the spring element in a surprisingly simple way such that the control sleeve is formed on an axial end with a base, wherein the base is used as an axial contact surface for the spring element. The control sleeve is typically made from a metal. The base can be formed, in particular, with a non-cutting process, for example, by a deep-drawing process. For installation, the control sleeve merely has to be inserted into the casing. Because the base can be supported by a surface on the casing, no additional material must be added to the casing.

In a preferred construction, the base has a recess through which a projection of the casing passes in the axial direction for a positive locking connection. This construction offers the advantage that the casing is used simultaneously as a guide or stabilization aid for the spring element. For example, the projection can have a pin-like construction and can act as a receptacle element for a helical spring. The pin projection centers the helical spring when it is inserted. At the same time, it forms a side guide for the mounted spring element. Through the positive locking engagement of the casing through the recess, the control sleeve is further fixed in the control valve.

Advantageously, the recess is formed with a multiple-fold, cyclic rotational symmetry, in particular, in the shape of a flower. Through multiple-fold rotational symmetry, it is achieved, with comparatively simple production, that the control sleeve is rotationally locked in the casing. A multiple-fold, cyclic rotational symmetry is given, for example, by a recess that is formed as a polygon. For a flower-shaped construction, contact areas on which the spring element is supported project inward between "leaf-shaped" recesses.

As another advantage, the invention provides that the base of the control sleeve can be used simultaneously as an axial counter support for a non-return valve. In this case, the use of an additional counter support for the non-return valve is eliminated. If an engagement of the casing through a recess in the base of the control sleeve is provided, then this engagement can preferably have a hollow construction. The non-return valve can then be supported on contact surfaces of the base extending inwards in the radial direction opposite the material of the "engagement."

BRIEF DESCRIPTION OF THE DRAWINGS

Embodiments of the invention are explained in more detail below with reference to a drawing. Shown are.

DETAILED DESCRIPTION OF THE PREFERRED EMBODIMENTS

Figure 1:
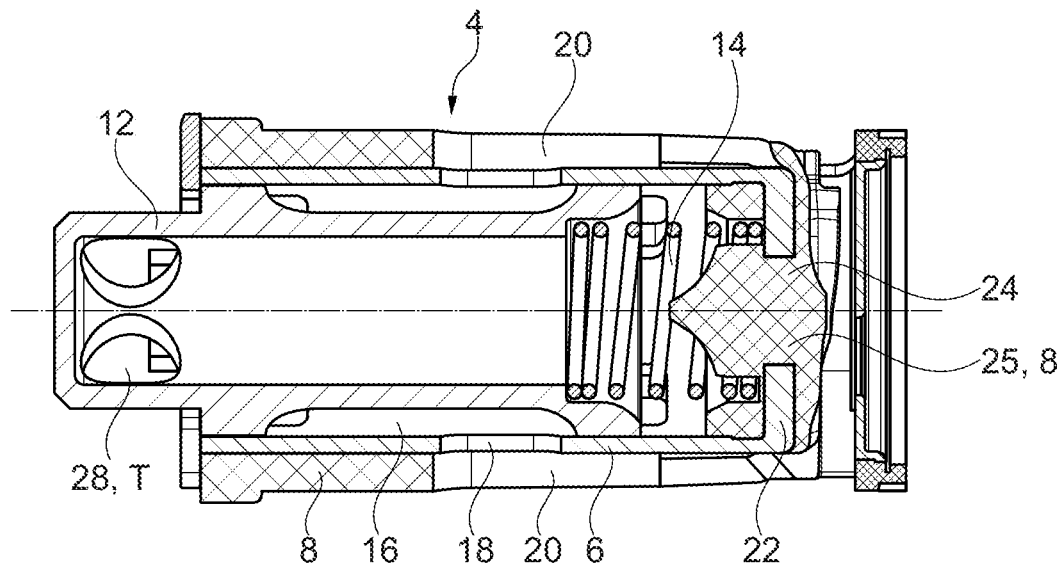
FIG. 1: in a cross section, a control valve for a hydraulic camshaft adjuster.

In FIG. 1, a control valve 4 in the form of a central valve is shown in a cross section. The control valve 4 can be inserted in a central hole of a camshaft adjuster or in a central screw. The control valve 4 essentially comprises a control sleeve 6 that is held in a casing 8. A control piston 12 is supported in the interior of the control sleeve 6 so that it can move in the axial direction. The control piston 12 is here pretensioned by means of a spring element 14. From the drawn position, the control piston 12 can be pushed into the control sleeve 6 against the spring force of the spring element 14.

To actuate the control piston 12, an actuator, for example, an electromagnet with a plunger, can engage the outer end side of this control piston in the axial direction. An axial sliding of the control piston 12 or control sleeve 6 from the casing 8 caused, in particular, by the spring force of the spring element 14 is prevented by a securing ring.

In the view provided, a pressurized medium space 16 that is formed between the control piston 12 and the control sleeve 6 and is connected to a pressurized line of the hydraulic system, for example, via an axial hole in the camshaft or in a central screw, can be seen. For this purpose, radial holes 18 that are connected to axial grooves 20 in the casing 8 in terms of flow are formed in the control sleeve 6. On their part, the grooves 20 are connected to the described axial hole in terms of flow.

On one axial end, the control sleeve 6 is formed with a base 22. This base 22 forms an axial contact surface for the spring element 14. The shown helical spring directly contacts the base 22 with one end. The other end of the helical spring acts against a collar in the interior of the control piston 12.

A recess 24 is formed in the base 22. A projection 25 that is formed as part of the casing 8 extends through this recess 24. The control sleeve 6 is made from a metal. The casing 8 is produced from plastic using a non-cutting method by a shaping process.

To discharge a hydraulic fluid, outlets 28 that open into a tank outlet T of the hydraulic system are provided on the end side of the control piston 12.

Figure 2:
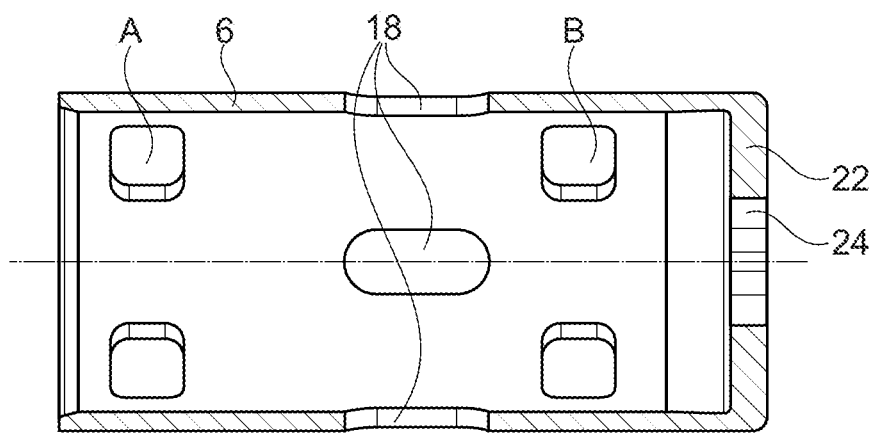
FIG. 2: in a cross section, a control sleeve made from the control valve according to FIG. 1, and FIG. 3: in a top view, the base of the control sleeve according to FIG. 2.

In FIG. 2, the control sleeve 6 corresponding to FIG. 1 is shown in a cross section. Visible here are the radial holes 18 that are loaded directly with pressure from a pressurized medium line. Furthermore, the base 22 is visible in the control sleeve 6. A central recess 24 that has a multiple-fold, cyclic rotational symmetry is formed in the base 22. Accordingly, the control sleeve 6 according to FIG. 1 is locked in rotation with the casing 8.

Furthermore, according to FIG. 2, work connections A, B for the opposing pressurized medium chambers of a camshaft adjuster can be seen on the control sleeve 6. By shifting the control piston 12 according to FIG. 1, the work connections A, B are alternately connected to the pressurized medium space 16 in terms of flow.

Figure 3:
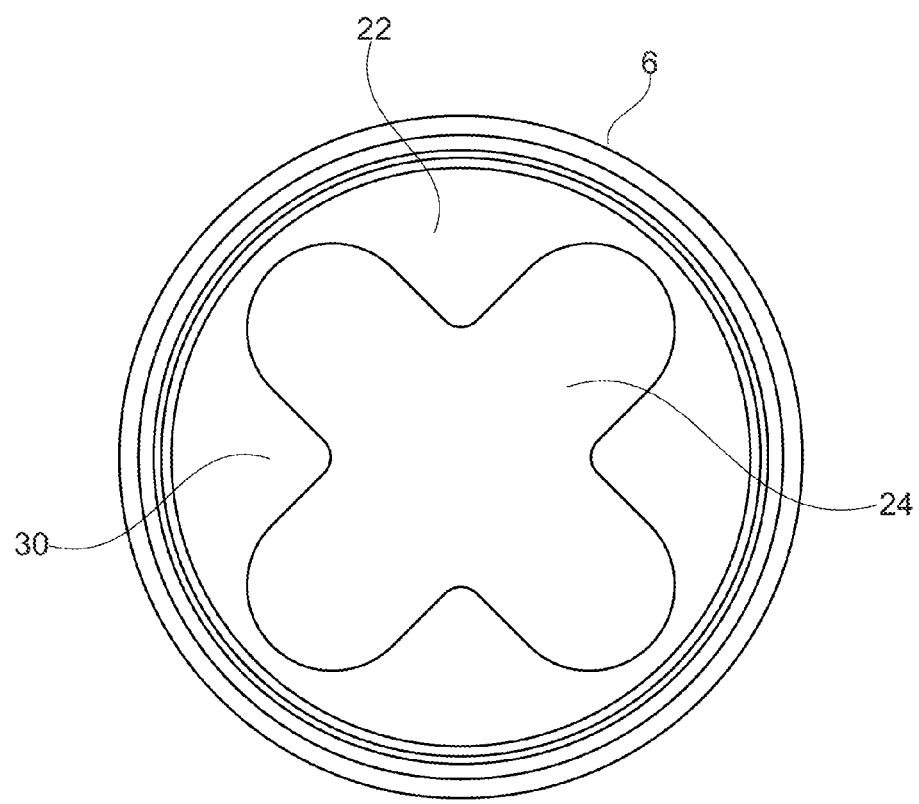

In FIG. 3, in a top view, the base 22 of the control sleeve 6 according to FIG. 2 is shown. Visible is the central recess 24 of the base 22 constructed with a flower-like shape with a 4-fold cyclic rotational symmetry. Through the flower shape, overall four contact surfaces 30 are formed that extend radially inward and on which the spring element 14 corresponding to FIG. 1 is supported.

The construction of the base 22 according to FIG. 3 is also suitable, in particular, as a counter support for a not-shown non-return valve. For this purpose, for example, the projection 25 according to FIG. 1 can have a hollow construction, so that the non-return valve in FIG. 1 in also supported from the right on the base 22 of the control sleeve 6.

LIST OF REFERENCE NUMBERS

4 Control valve
6 Control sleeve
8 Casing
12 Control piston
14 Spring element
16 Pressurized medium space
18 Radial hole
20 Groove
22 Base
24 Recess
25 Projection
28 Outlet
30 Contact surfaces

The invention claimed is:

1. A control valve for controlling flows of pressurized medium of a camshaft adjuster, said control valve comprises an essentially hollow cylindrical control sleeve arranged inside a casing and a guided control piston that is movable in an axial direction inside the control sleeve against a spring force of a spring element, the control sleeve has, on an axial end, a base that is an axial contact surface for the spring element, the base comprises a recess through which a projection of the casing passes in the axial direction in a positive locking connection, and the projection extends through the base of the control sleeve.

2. The control valve according to claim 1, wherein the recess is formed with a multiple-fold, cyclic rotational symmetry.

\* \* \* \* \*